(12) United States Patent
Iinuma

(10) Patent No.: US 8,244,936 B2
(45) Date of Patent: Aug. 14, 2012

(54) DATA COMMUNICATION APPARATUS FOR STABILIZING THE CONNECTION OF A COMMUNICATION LINE BETWEEN DATA COMMUNICATION APPARATUSES AND PROGRAM THEREFOR

(75) Inventor: Nobuharu Iinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 11/056,370

(22) Filed: Feb. 14, 2005

(65) Prior Publication Data

US 2006/0112200 A1 May 25, 2006

(30) Foreign Application Priority Data

Nov. 24, 2004 (JP) ................................ 2004-338883

(51) Int. Cl.
*G06F 3/00* (2006.01)
*G06F 5/00* (2006.01)
*H04B 1/38* (2006.01)
*H04B 5/16* (2006.01)

(52) U.S. Cl. .............. 710/48; 710/10; 710/49; 375/222; 713/1; 713/2; 713/310

(58) Field of Classification Search ...................... 710/48
See application file for complete search history.

(56) References Cited

U.S. PATENT DOCUMENTS

| 4,868,782 | A | | 9/1989 | Lawrence et al. | |
| 5,446,906 | A | * | 8/1995 | Kardach et al. | 713/323 |
| 5,721,830 | A | | 2/1998 | Yeh et al. | |
| 5,983,362 | A | * | 11/1999 | Yasunaga et al. | 714/23 |
| 6,412,074 | B1 | * | 6/2002 | Flannery | 713/310 |
| 6,539,472 | B1 | * | 3/2003 | Fujishima | 713/2 |
| 6,574,693 | B1 | * | 6/2003 | Alasti et al. | 710/262 |
| 6,687,350 | B1 | * | 2/2004 | Landry et al. | 379/144.04 |
| 6,708,231 | B1 | * | 3/2004 | Kitagawa | 710/10 |
| 7,058,733 | B2 | * | 6/2006 | Vong et al. | 710/18 |
| 2003/0167369 | A1 | * | 9/2003 | Chen et al. | 710/306 |
| 2003/0193999 | A1 | * | 10/2003 | Iinuma | 375/222 |

FOREIGN PATENT DOCUMENTS

| JP | 62-290952 | 12/1987 |
| JP | 9-168008 | 6/1997 |
| JP | 9-231153 | 9/1997 |
| JP | 11-296251 | 10/1999 |
| JP | 2002-325114 | 11/2002 |

OTHER PUBLICATIONS

Communication mailed from the Japanese Patent Office on Feb. 9, 2010 in the related Japanese patent application No. 2004-338883.

* cited by examiner

*Primary Examiner* — Chun-Kuan Lee
*Assistant Examiner* — Brooke Taylor
(74) *Attorney, Agent, or Firm* — Staas & Halsey LLP

(57) ABSTRACT

A data communication apparatus 1 has a processing section (CPU) 10 that executes at least a part of communication processing of a communication controller 2 and that executes processing other than the communication processing, wherein The data communication apparatus 1 has an interrupt request blocking section 20 that blocks, during execution of a processing relevant to information exchange concerning a communication condition for the communication controller 2 to carry out a communication processing, an interrupt request to the processing section 10 with priority over the processing relevant to information exchange. With this arrangement, even when additional operation is carried out to execute an interrupt processing during execution of a processing concerning a communication condition such as a modulation system of a modem and a communication speed, the processing can be executed securely and a stable connection of a communication line can be maintained.

18 Claims, 4 Drawing Sheets

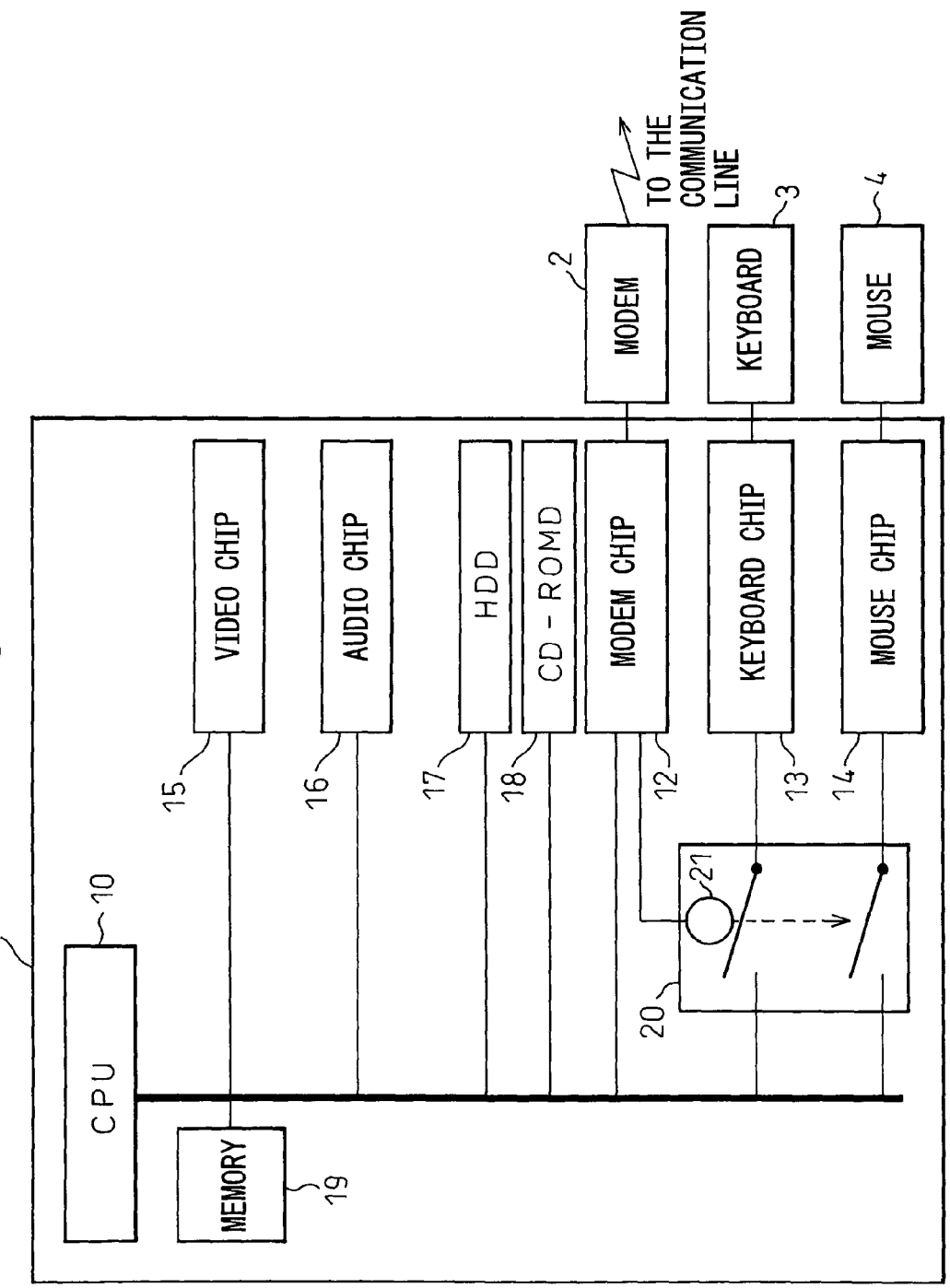

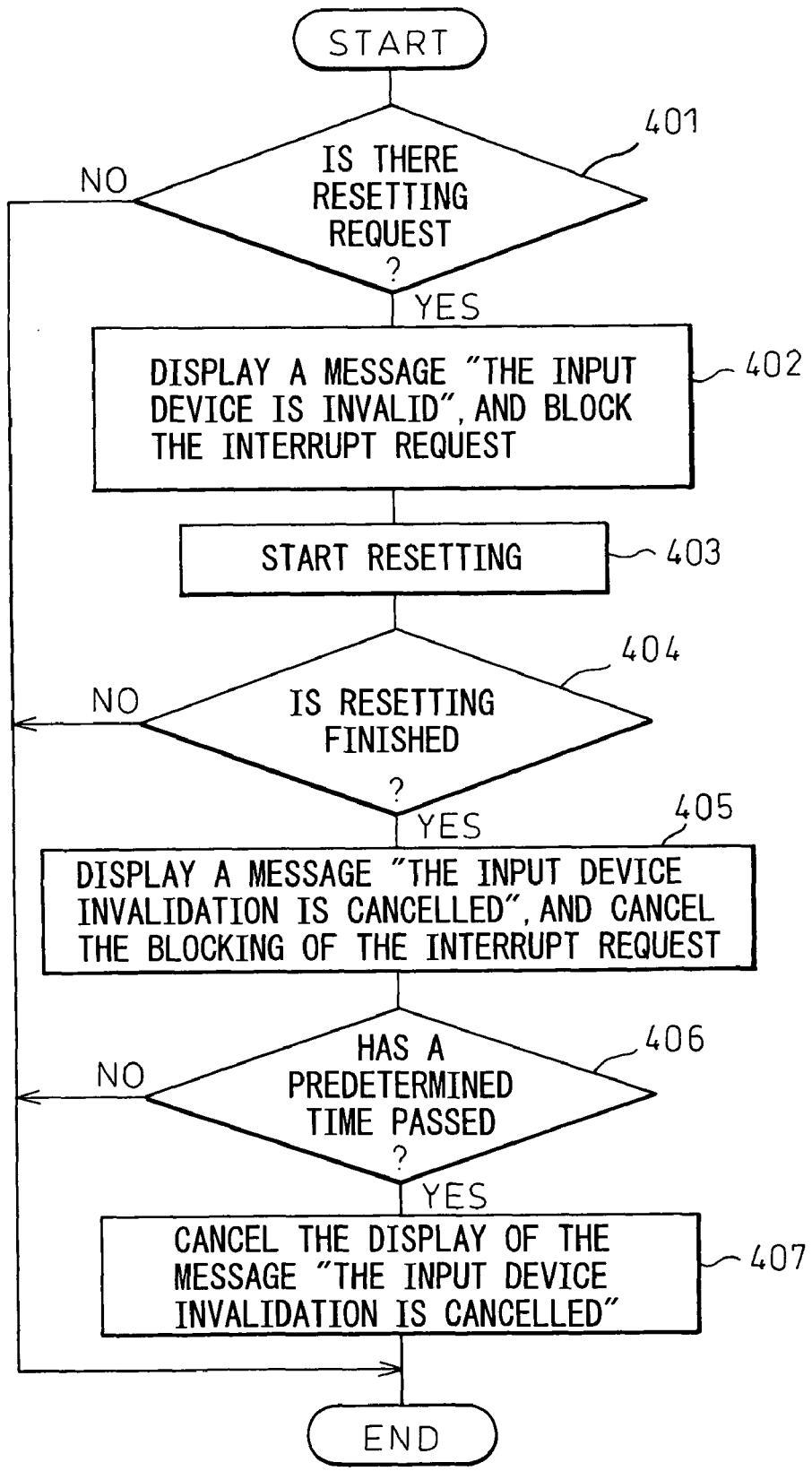

DATA COMMUNICATION APPARATUS FOR STABILIZING THE CONNECTION OF A COMMUNICATION LINE BETWEEN DATA COMMUNICATION APPARATUSES AND PROGRAM THEREFOR

CROSS-REFERENCE TO RELATED APPLICATION

This application claims priority from, and incorporates by reference the entire disclosure of, Japanese Patent Application (1) No. 2004-338883, filed on Nov. 24, 2004.

BACKGROUND OF THE INVENTION

1. Field of the Invention

The present invention relates to a processing controller, a data communication apparatus such as a personal computer, and a program for the controller and apparatus. Particularly, the invention relates to a processing controller, a data communication apparatus that incorporates a software modem to stabilize a connection of a communication line between data communication apparatuses, and a program for the controller and apparatus.

2. Description of the Related Art

In order to maintain a stable operation of a communication line while the communication line is being connected to a bulletin board system (BBS) or other data communication apparatus, telecommunication equipment such as a modem always monitors line quality, and automatically resets communication functions and performance such as a communication speed and a modulation system (i.e., retraining, and rate renegotiation). With the increase in the operating speed of CPUs in recent years, software is being developed for telecommunication equipment such as modems. The bulletin board system conventionally refers to the whole of personal computer communication services, and nowadays refers to a data communication apparatus provided in a Web site mode on the Internet. The retraining refers to a negotiation operation that two sets of telecommunication equipment (i.e., modem) carry out to determine the setting of communication functions and performance by mutually exchanging information about communication speed, modulation system, error correction function, and data compression procedure, to establish communications. Particularly, negotiation to reset a communication speed is called rate renegotiation. The retraining is the processing to renegotiate communication functions and performance currently in use, without re-connecting the mutually-connected two modems. The retraining occurs when a line state changes as a result of increase in the amount of static electricity on the line, for example. Usually, this processing takes a few seconds.

Patent literature 1 discloses an information processor that restricts power consumption of a CPU by variably controlling the clock frequency of the CPU using a software modem, that is, a software system for a computer main body to execute a part of the functions of a modem that connects between the computer and an analog communication line. The patent literature 1 also discloses an information processor that restricts communication errors such as a connection refusal and a timeout, by variably controlling the clock frequency following a necessary CPU load that changes according to a negotiation state.

Patent literature 2 discloses a software modem for a data communication apparatus, in which, when there is an instruction to process a specific application with a higher processing priority than that of a modem processing of resetting communication functions and performance, the software modem starts processing this specific application even when the modem processing is being carried out. In order to properly execute the modem processing while properly executing the processing of other applications, the software modem changes a communication speed according to the number of applications being started, the state of the load of the applications being started on the CPU, and the time required for the modem processing.

Patent literature 1: Japanese Patent Application Unexamined Publication No. 11-296251 (paragraphs 0009 to 0015, 0019, 0022, 0024 to 0029, and 0066 to 0068, and FIG. 2 and FIG. 3).

Patent literature 2: Japanese Patent Application Unexamined Publication No. 2002-325114 (paragraphs 0002, 0005, 0006, 0009 and 0010).

Usually, the modem operates in a quiet mode after the line is connected. A user does not recognize that communication is now being reset. The modem executes a reset to stably operate communication. The software modem is most unstable during the resetting of communication such as a resetting of a modulation system and a communication speed. The load on the CPU is largest during this resetting. If, while the CPU is being applied with large load, the CPU receives an interrupt request to process a specific application having a higher priority than that of a retraining processing and, for example, when there is an interrupt request to start a word processor or reproduce a DVD that applies large load on the CPU, the CPU usually executes the interrupt processing with priority over the retraining processing. Therefore, the retraining processing is not executed. When this processing continues for a long time based on the interrupt request, the CPU cannot communicate with the other communication apparatus to reset communication. Consequently, the retraining processing cannot be carried out normally, and the line is disconnected.

The information processor described in the patent literature 1 variably controls the clock frequency following the necessary load on the CPU that changes based on the negotiation state. On the other hand, the software modem described in the patent literature 2 changes the communication speed according to the number of applications being started, the state of the load of the applications being started on the CPU, and the time required for the modem processing. However, the above operations do not solve a problem of a line disconnection that occurs when the CPU executes the interrupt processing with priority over the retraining processing during the resetting of communication functions and performance which applies a large load to the CPU.

SUMMARY OF THE INVENTION

In order to solve the above problem, the present invention provides a processing controller, a data communication apparatus incorporating a software modem, and a program for these apparatuses that can securely reset communication functions and performance such as a modulation system and a communication speed and can maintain stable connection of a communication line, even when a CPU is instructed to execute interrupt processing that has priority over retraining processing during the resetting operation.

In order to achieve the above object of the invention, there is provided a processing controller for a data communication apparatus having a processing section that executes at least a part of communication processing of a communication controller and that executes processing other than the communication processing. The processing controller has an interrupt request blocking section that blocks, during execution of a processing relevant to information exchange concerning a communication condition for the communication controller to carry out a communication processing, an interrupt request to the processing section with priority over the processing relevant to information exchange.

In order to achieve the above object of the invention, there is provided a data communication apparatus having a processing section that executes at least a part of communication processing of a communication controller and that executes processing other than the communication processing. The data communication apparatus has an interrupt request blocking section that blocks, during execution of a processing relevant to information exchange concerning a communication condition for the communication controller to carry out communication processing, an interrupt request to the processing section with priority over the processing relevant to information exchange.

In the data communication apparatus, an input device carries out the interrupt request to the processing section with priority over the processing relevant to information exchange during the execution of this processing.

The data communication apparatus displays a message to the effect that the operation carried out by the input device is invalid during the execution of the processing relevant to information exchange.

In order to achieve the above object of the invention, there is provided a program that is executed in a data communication apparatus having a processing section that executes at least a part of communication processing of a communication controller and that executes processing other than the communication processing. The program functions as an interrupt request blocking section that blocks, during execution of a processing relevant to information exchange concerning a communication condition for the communication controller to carry out a communication processing, an interrupt request to the processing section with priority over the processing relevant to information exchange.

According to the processing controller, the data communication apparatus, and software of the present invention, operation that gives a large load to the CPU can be blocked while the software modem is resetting communication functions and performance such as a modulation system and a communication speed. Therefore, the communication functions and performance can be reset securely, and stable connection of a communication line can be maintained.

BRIEF DESCRIPTION OF THE DRAWINGS

FIG. 3 is a block configuration diagram of a mother-board shown in FIG. 1; and

FIG. 4 is a flowchart showing a modem processing routine according to the present invention.

DESCRIPTION OF THE PREFERRED EMBODIMENTS

Embodiments of the present invention are explained in detail below with reference to the appended drawings.

Figure 1:
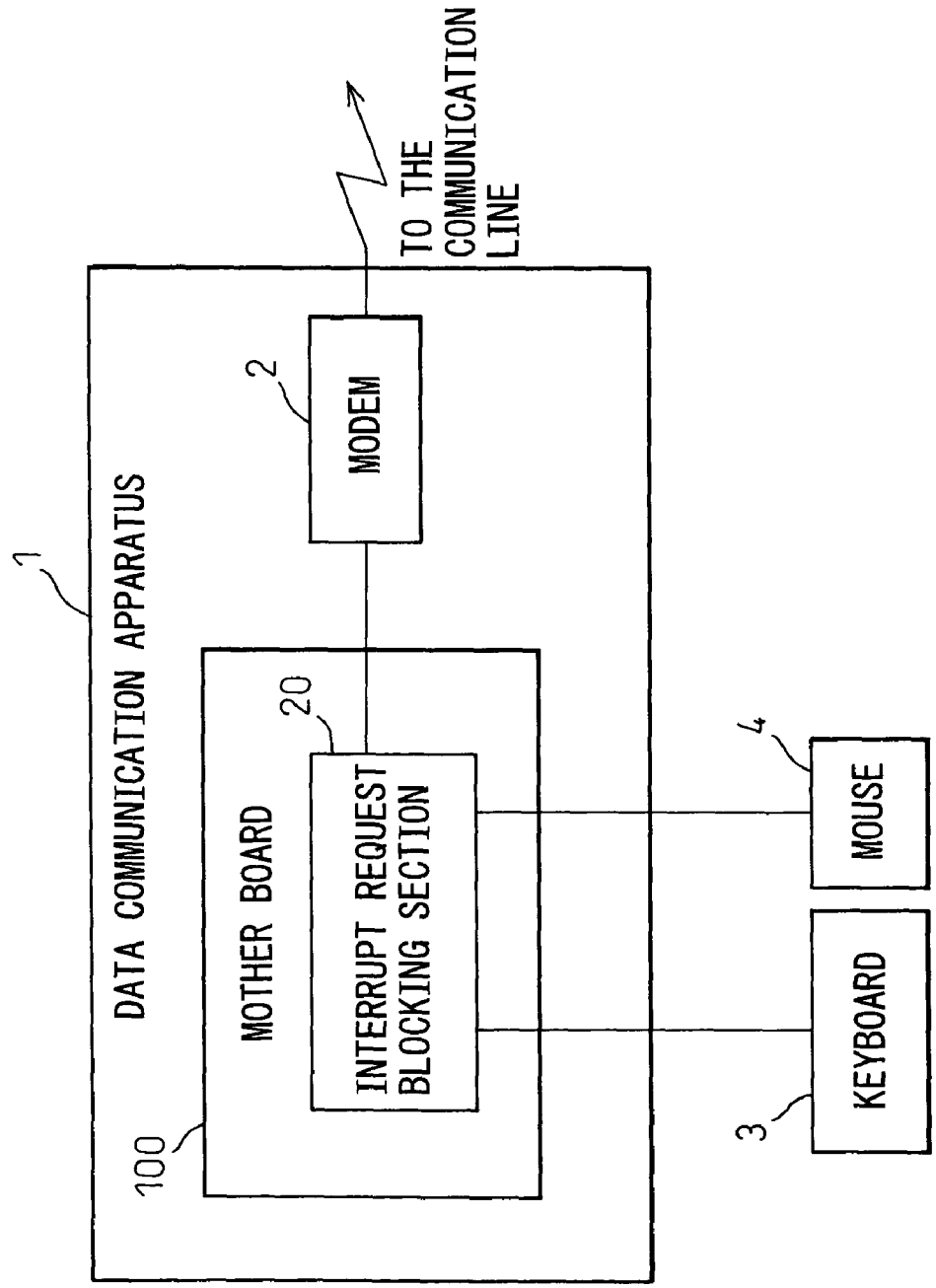
FIG. 1 is a block configuration diagram showing main parts of a data communication apparatus according to a first embodiment of the present invention.

FIG. 1 is a block configuration diagram showing main parts of a data communication apparatus according to a first embodiment of the present invention. A data communication apparatus 1 shown in FIG. 1 is a personal computer, for example. The personal computer 1 incorporates a modem 2, and a mother board 100 that is connected to an input device such as a keyboard 3, a mouse 4, and a scanner and a light pen not shown. The data communication apparatus 1 is connected to another data communication apparatus via the modem 2, and a communication line such as a telephone circuit, to thereby carry out communications. An interrupt request blocking section 20 is provided in the mother board 100. The interrupt request blocking section 20 has a function of blocking the CPU provided in the mother board 100 of the data communication apparatus 1 from executing an interrupt processing having priority over retraining processing while the modem 2 is resetting communication functions and performance such as a modulation system and a communication speed.

Figure 2:
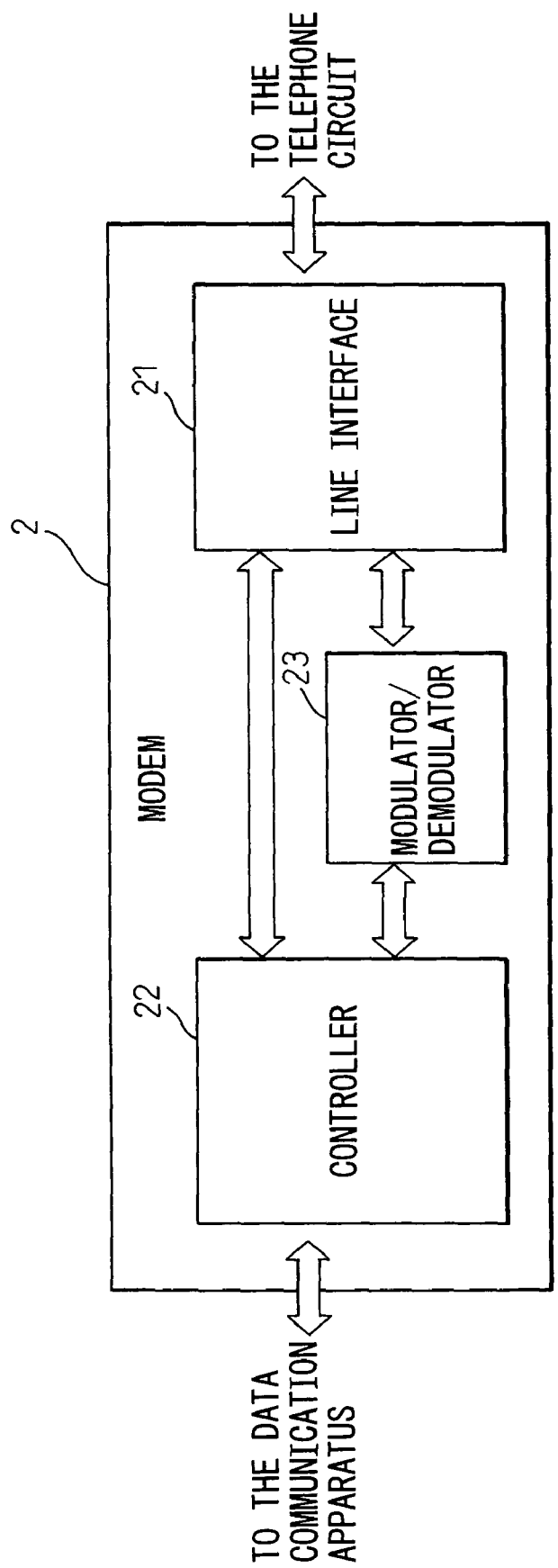
FIG. 2 is a block configuration diagram showing functions of a modem shown in FIG. 1.

FIG. 2 is a block configuration diagram showing functions of a modem shown in FIG. 1. The modem 2 converts (modulates) digital data transmitted from a data communication apparatus into an analog audio signal, and sends the signal to a telephone circuit. The modem 2 also converts (demodulates) an analog audio signal transmitted through a telephone circuit into digital data. According to the recommendations (V series) of the International Telecommunication Union (ITU) concerning a modem, 33.6 kbps is a maximum communication speed of a vertical symmetric type for which a communication speed in the direction from a subscriber to a telephone office is the same as a communication speed in the direction from a telephone office to a subscriber. For a vertical asynchronous type of which communication speeds are different between both directions, a maximum communication speed is 33.6 kbps for an up direction, and 56 kbps for a down direction, respectively.

The modem 2 is always monitoring the quality of a telephone circuit. The modem 2 has a function of resetting a circuit speed, a protocol, an error correction, and a data compression system at any time when noise is mixed into the telephone circuit or when a reception level or an S/N ratio becomes low, to maintain the throughput and the line connection (This is prescribed in the recommendations of the ITU-T V.90 and the ITU-T V.34). A controller 22 reads the information of a line interface 21 to monitor the quality of the telephone circuit. Noise includes power source noise, noise of electromagnetic waves of a microwave oven, and noise of an inverter of an air conditioner. According to a modem currently available, software, that is, driver software that operates on the operating system, plays the main roles of the controller 22 and a modulator/demodulator 23, based on the speeding up of the CPU provided on the data communication apparatus on which the modem is mounted. Therefore, this modem is called a software modem.

FIG. 3 is a block configuration diagram of the mother board shown in FIG. 1. The mother board 100 that is incorporated in the data communication apparatus 1 is mounted with a CPU 100, and various items that are connected to the CPU 10 via a bus line, including a modem chip 12, a keyboard chip 13, a mouse chip 14, a video chip 15, an audio chip 16, a hard disk drive (HDD) 17 such as a magnetic disk and a magnetic optical disk as an external storage, a CD-ROM drive 18, and a memory 19 such as a RAM as an internal storage. The CD-ROM drive 18 can be replaced by a DVD-ROM drive. The modem chip 12, the keyboard chip 13, the mouse chip 14, the video chip 15, and the audio chip 16 respectively have interface functions to take interface between the CPU 10 and the modem 2, the keyboard 3, the mouse 4, a display not shown, and a speaker not shown, respectively in this order. The interrupt request blocking section 20 is provided on the mother board 100. The CPU 10 carries out communication control processing to realize the software modem, and executes the operating system as other software, and various programs of a word processor, DVD reproduction, etc.

The interrupt request blocking section 20 has a relay 21 that is excited/non-excited by the modem chip 12. Based on the excitation/non-excitation of the relay 21, the bus line that connects the CPU 10 with the keyboard chip 13 and the mouse chip 14 that are connected to the input device (i.e., the keyboard 3 and the mouse 4) is blocked or the block is cancelled for a predetermined time. The relay 21 is usually in a non-excited state. When the input device is operated to prepare a new document, for example, the CPU 10 receives this instruction, and executes interrupt processing. This interrupt processing refers to making access to an application stored in the hard disk not shown via the HDD 17 to write into the memory 19, or rewriting the screen of the display unit not shown by the video chip 15, for example. The CPU 10 executes this processing with priority over the resetting processing carried out by the modem 2.

A program for a modem processing routine that is used for the software modem is written into the memory 19 directly or via a recording medium. Alternatively, the program is downloaded from another computer connected via a communication line, and is written into the memory 19. The program is then stored into the own hard disk. The CPU 10 executes the program by writing it into the memory 19 according to need.

FIG. 4 is a flowchart showing the modem processing routine according to the present invention. The driver software of the modem 2 executes this routine in a predetermined cycle.

At step 401, the modem 2 monitors the quality of the telephone circuit. The controller 22 reads the information of the line interface 21, and decides whether there is a request for resetting (retraining) communication functions and performance such as a modulation system and a communication speed. When it is decided that there is a request for resetting communication functions and performance, the process proceeds to step 402. When it is decided that there is no request for resetting, the present routine is finished.

At step 402, the modem 2 displays, on the screen of the display unit not shown, a message "the input device is invalid" that indicates that it is not possible to make the CPU 10 execute an interrupt processing with priority over the retraining processing. At the same time, the modem chip 12 excites the relay within the interrupt request blocking section 20 to open the relay contact. As a result, the bus line that connects the CPU 10 with the keyboard switch 13 and the mouse chip 14 connected to the input device (i.e., the keyboard 3 and the mouse 4) is blocked. Consequently, a signal input from the input device to the CPU 10 is blocked. With this arrangement, a user is persuaded not to carry out additional operation during the resetting. During the execution of the resetting, voice can be output as well as the message "the input device is invalid" is displayed on the screen. In other words, during the resetting, the sound volume of the modem is increased to inform the user of the data communication apparatus, by voice, that the communication functions and performance are being reset.

At step 403, the resetting is started.

At step 404, it is decided whether the resetting has ended. When it is decided that the resetting has ended, the process proceeds to step 405. When it is decided that the resetting has not ended yet, the present routine is finished.

At step 405, a message "the input device invalidation is cancelled" is displayed on the screen of the display unit to indicate that the CPU 10 can restart operation of executing an interrupt processing with priority over the retraining processing. At the same time, the modem chip 12 de-excites the relay within the interrupt request blocking section 20 to close the relay contact. As a result, the blocking of the bus line that connects the CPU 10 with the keyboard switch 13 and the mouse chip 14 connected to the input device (i.e., the keyboard 3 and the mouse 4) is cancelled. Consequently, a signal is normally input again from the input device to the CPU 10.

At step 406, it is decided whether a predetermined time has passed since the start of the execution of the processing at step 405. When a predetermined time has passed, the process proceeds to step 407. When a predetermined time has not passed, the present routine is finished. At step 407, the message "the input device invalidation is cancelled" that is displayed on the screen of the display unit is cancelled.

During the resetting, the operation of the input device can be stored in the memory 19 of the CPU 10. After the resetting, the operation stored in the memory 19 can be executed.

What is claimed is:

1. A processing controller for a data communication apparatus having a processing section that executes at least a part of communication processing of a communication controller, including monitoring a quality of a telephone circuit, and that executes processing other than the communication processing, wherein the processing controller has an interrupt request blocking section that blocks, during execution of processing of resetting communication functions and performance including at least a communication speed and modulation system to carry out a communication processing, an interrupt request to the processing section with priority over the processing of resetting communication functions and performance by blocking a bus line connected between the processing section and an input device in order to prevent a large load from being passed to the processing section, and unblocking the bus line when the resetting is completed.

2. A data communication apparatus, comprising:

a processing section that executes at least a part of communication processing of a communication controller, including monitoring a quality of a telephone circuit, and that executes processing other than the communication processing; and an interrupt request blocking section that blocks, during execution of a processing of resetting communication functions and performance including at least a communication speed and modulation system to carry out a communication processing, an interrupt request to the processing section with priority over the processing of resetting communication functions and performance by blockinq a bus line connected between the processing section and an input device in order to prevent a large load from being passed to the processing section, and unblockinq the bus line when the resetting is completed.

3. The data communication apparatus according to claim 2, wherein the data communication apparatus displays a message, to the effect that operations carried out by the input device are invalid, during the execution of the processing of resetting communication functions and performance.

4. The data communication apparatus according to claim 2, wherein the data communication apparatus displays a message to the effect that operations carried out by the input device are invalid, during the execution of the processing of resetting communication functions and performance.

5. The data communication apparatus according to claim 2, wherein the data communication apparatus outputs a voice during the execution of the processing of resetting communication functions and performance.

6. The data communication apparatus according to claim 2, wherein the data communication apparatus outputs a voice during the execution of the processing of resetting communication functions and performance.

7. The data communication apparatus according to claim 3, wherein the data communication apparatus outputs a voice during the execution of the processing of resetting communication functions and performance.

8. The data communication apparatus according to claim 4, wherein the data communication apparatus outputs a voice during the execution of the processing of resetting communication functions and performance.

9. The data communication apparatus according to claim 2, wherein the data communication apparatus displays a message to the effect that invalidation of operations of the input device are cancelled after ending the execution of the processing of resetting communication functions and performance.

10. The data communication apparatus according to claim 5, wherein the data communication apparatus stops outputting the voice after ending the execution of the processing of resetting communication functions and performance.

11. A non-transitory computer readable medium storing a program that is executed in a data communication apparatus having a processing section that executes at least a part of communication processing of a communication controller, including monitoring a quality of a telephone circuit, and that executes processing other than the communication processing, wherein
the program functions as an interrupt request blocking section that blocks, during execution of a processing of resetting communication functions and performance including at least a communication speed and modulation system to carry out a communication processing, an interrupt request to the processing section with priority over the processing of resetting communication functions and performance by blocking a bus line connected between the processing section and an input device in order to prevent a large load from being passed to the processing section, and unblocking the bus line when the resetting is completed.

12. The non-transitory computer readable medium according to claim 11, wherein the data communication apparatus displays a message to the effect that operations carried out by the input device are invalid during the execution of the processing of resetting communication functions and performance.

13. The non-transitory computer readable medium according to claim 11, wherein the data communication apparatus displays a message to the effect that operations carried out by the input device are invalid during the execution of the processing of resetting communication functions and performance.

14. The non-transitory computer readable medium according to claim 11, wherein the data communication apparatus outputs voice during the execution of the processing of resetting communication functions and performance.

15. The non-transitory computer readable medium according to claim 11, wherein the data communication apparatus outputs voice during the execution of the processing of resetting communication functions and performance.

16. The non-transitory computer readable medium according to claim 11, wherein the data communication apparatus displays a message to the effect that invalidation of operations of the input device are cancelled after ending the execution of the processing of resetting communication functions and performance.

17. The non-transitory computer readable medium according to claim 14, wherein the data communication apparatus stops outputting the voice after ending the execution of the processing of resetting communication functions and performance.

18. A processing controller for a communication apparatus, comprising:
a communication processor that monitors a quality of communication line and resets communication functions and performance based on the monitoring; and
an interrupt request blocking circuit that blocks a bus line connected between the processing controller and an input device to block an interrupt request inputted through the input device during the resetting, and unblocks the bus line when the resetting is completed.

* * * * *

UNITED STATES PATENT AND TRADEMARK OFFICE
CERTIFICATE OF CORRECTION

| | |
|---|---|
| PATENT NO. | : 8,244,936 B2 |
| APPLICATION NO. | : 11/056370 |
| DATED | : August 14, 2012 |
| INVENTOR(S) | : Nobuharu Iinuma |

Page 1 of 1

It is certified that error appears in the above-identified patent and that said Letters Patent is hereby corrected as shown below:

Column 6, Line 50, In Claim 2, delete "blockinq" and insert -- blocking --, therefor.
Column 6, Line 53, In Claim 2, delete "unblockinq" and insert -- unblocking --, therefor.

Signed and Sealed this
Sixth Day of November, 2012

David J. Kappos
*Director of the United States Patent and Trademark Office*